(12) United States Patent
Zhu et al.

(10) Patent No.: US 11,036,409 B2
(45) Date of Patent: Jun. 15, 2021

(54) NON-VOLATILE MEMORY USING A REDUCED NUMBER OF INTERCONNECT TERMINALS

(71) Applicant: Intel Corporation, Santa Clara, CA (US)

(72) Inventors: Zhenyu Zhu, Folsom, CA (US); Chai Huat Gan, Bukit Mertajam (MY); Mikal Hunsaker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 15/843,545

(22) Filed: Dec. 15, 2017

(65) Prior Publication Data

US 2019/0042087 A1     Feb. 7, 2019

(51) Int. Cl.
| | |
|---|---|
| *G06F 3/06* | (2006.01) |
| *G06F 12/02* | (2006.01) |
| *G06F 13/42* | (2006.01) |
| *G06F 13/16* | (2006.01) |

(52) U.S. Cl.
CPC .......... *G06F 3/0632* (2013.01); *G06F 3/061* (2013.01); *G06F 3/0655* (2013.01); *G06F 3/0679* (2013.01); *G06F 12/0246* (2013.01); *G06F 13/1694* (2013.01); *G06F 13/4282* (2013.01); *G06F 2212/7206* (2013.01); *G06F 2213/0002* (2013.01); *G06F 2213/0024* (2013.01)

(58) Field of Classification Search
None
See application file for complete search history.

(56) References Cited

U.S. PATENT DOCUMENTS

2015/0363121 A1* 12/2015 Jung ...................... G06F 3/0617
711/154

* cited by examiner

*Primary Examiner* — Charles J Choi
(74) *Attorney, Agent, or Firm* — Schwabe, Williamson & Wyatt, P.C.

(57) ABSTRACT

A first signal may be received from a memory device at a first interconnect terminal of a number of interconnect terminals via a serial communication interface that indicates the memory device includes a NAND type memory device. Whether a second signal that indicates the NAND type memory device is initialized has been received from the memory device at a second interconnect terminal of the number of interconnect terminals may be determined. An operation associated with the NAND type memory device may be performed at the second interconnect terminal and a third interconnect terminal in response to determining the second signal has been received from the memory device indicating the NAND type memory device is initialized.

20 Claims, 9 Drawing Sheets

NON-VOLATILE MEMORY USING A REDUCED NUMBER OF INTERCONNECT TERMINALS

DESCRIPTION OF EMBODIMENTS

Figure 1A:
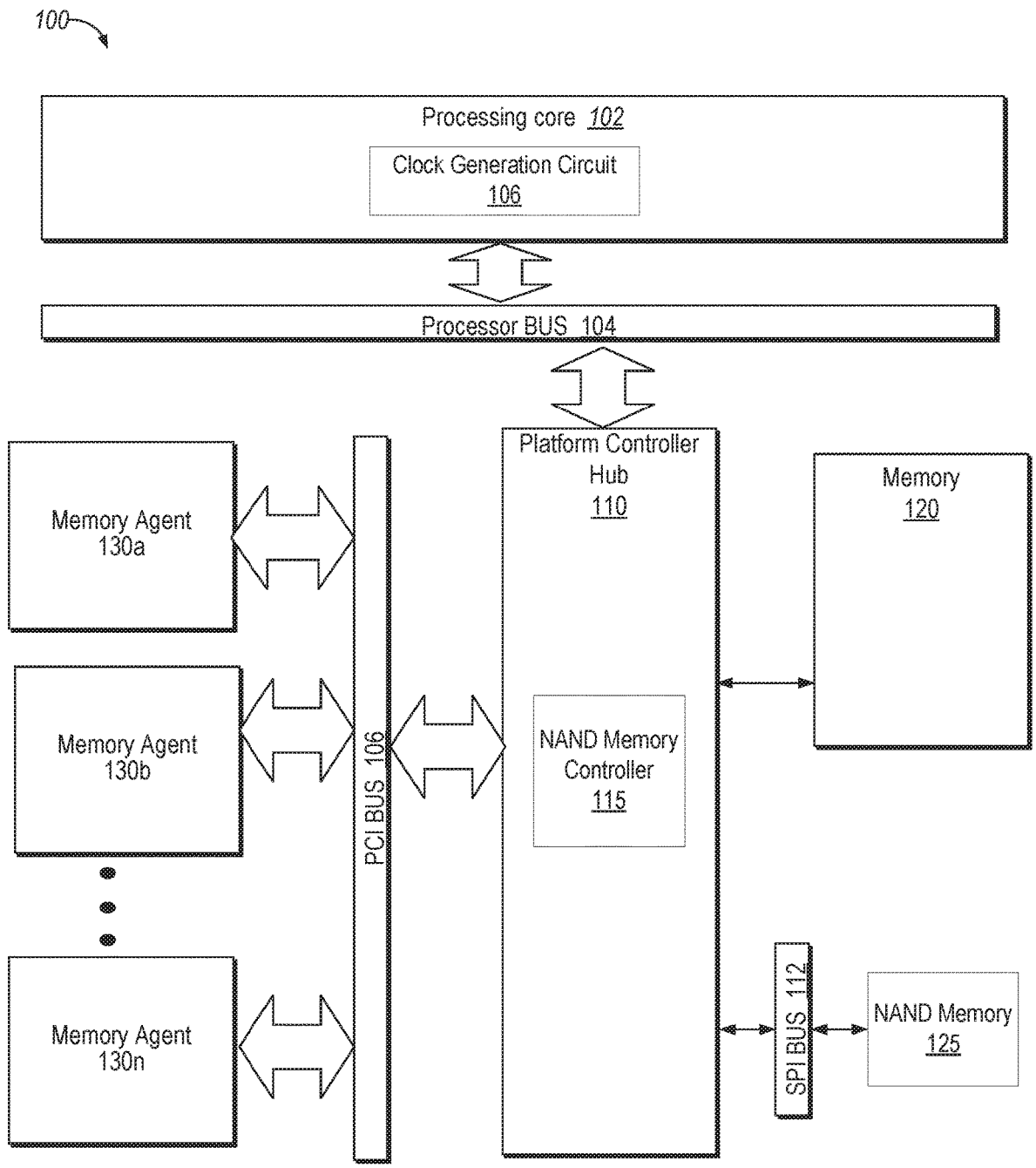
FIG. 1A illustrates a processing system with a NAND memory controller to control a NAND type memory device over a serial communication interface according an embodiment of the present disclosure.

The embodiments described herein are directed to NAND type non-volatile memory (NVM) controllers that communicate with NVM, such as flash memory, over a serial interface. Flash memory is an electronic non-volatile computer storage medium that can be electrically erased and reprogrammed. Flash memory can be a NAND type or a NOR type of flash memory. The embodiments described herein are directed towards a NAND memory controller with serial interface logic that communicates with NAND flash memory over the serial interface. The NAND flash memory may be coupled to a processing device via a Serial Peripheral Interface (SPI) bus that includes a number of interconnect terminals that are coupled to hardware logic circuits of the processing device and the flash memory. The SPI bus may operate using a master-slave architecture with a single master having ownership of the SPI bus, allowing the master to drive the SPI bus. Signals of data may be provided between the processing device and the flash memory via the interconnect terminals of the SPI bus. The signals may be driven to a high value (e.g., a value of 1) or a low value (e.g., a value of 0) to represent a single bit of data. The signals can toggle between high and low values over time to represent a sequence of bits corresponding to data being transferred by the processing device and/or flash memory.

As noted above, one type of flash memory is a NOR flash memory. In a NOR flash memory device, each cell of the memory device has one end connected to a ground line and the other end connected to a bit line to form a storage transistor. A NOR flash memory device may be coupled to an SPI bus via a number of interconnect terminals. For example, the NOR flash memory may couple to the SPI via 5 interconnect terminals. However, NOR flash memory has a relatively large chip area for a given capacity, making NOR flash memory less cost-effective per bit of memory when compared to other types of memories. Furthermore, the larger chip area per bit of NOR flash memory may become a design constraint as new platforms increase the amount of data to be stored on the flash memory of the system.

Another type of flash memory is NAND flash memory. In a NAND type memory device, several storage transistors are connected in series rather than the single storage transistor configuration of the NOR flash memory. This results in the NAND type memory device having a smaller chip area per bit of memory in comparison to a NOR flash memory. However, the configuration of the NAND type memory device makes operations performed by the NAND type memory device more complex in comparison to a NOR flash memory, which previously increased the number of interconnect terminals that couple to the NAND type memory device, to drive operations associated with the NAND type memory device. Prior solutions that used a NAND type memory device may have a larger number of interconnect terminals in comparison to a NOR flash memory. For example, a NAND type memory device may have up to 32 interconnect terminals in comparison to a NOR flash memory, which may have 5 interconnect terminals. The increased number of interconnect terminals to drive a NAND type memory device may make integrating a NAND flash memory into a processing device troublesome and inefficient. For example, all flash memory access operations of the processing device may be have to be rewritten to support the operations being performed on a NAND type memory device that includes a larger number of interconnect terminals, which is tedious, time consuming and error-prone.

The devices, systems, and methods, as disclosed herein, provide for a system including a NAND type memory device having a reduced number of interconnect terminals. The reduced number of interconnect terminals may permit the use of a NAND type memory device in a system that was previously configured to a NOR flash memory without changing the hardware (e.g., the SPI bus) or the flash memory access operations of the system. The NAND type memory device having a reduced number of interconnect terminals may increase the amount of data storage available on the flash memory of a system without increasing the chip area of the flash memory, improving the performance of the system. Furthermore, the NAND type memory device having the reduced number of interconnect terminals may reduce the number of flash memory access operations that need to be rewritten to support the NAND type memory device, further improving the performance of the system. As noted above, also described herein are embodiments of a NVM controller with serial interface logic that operate with the NAND type memory device over a serial interface for the various memory operations as described herein.

In one embodiment, the processing device of a system may be coupled to a NAND type memory device via an SPI bus having 5 interconnect terminals. The first interconnect terminal of the SPI bus may transmit a signal from the NAND type memory device to the processing device that indicates the memory device is a NAND type memory device. For example, when the memory device is a NAND type memory device, the NAND type memory device may drive the signal on the first terminal to a high value (e.g., a value of 1). The processing device may then receive the signal having a high value, indicating that the memory device includes a NAND type memory device. Alternatively, the processing device may receive a signal having a low value, indicating that the memory device does not include a NAND type memory device.

Subsequent to receiving the signal indicating the memory device is a NAND type memory device, the processing device may monitor a second signal on a second interconnect terminal of the SPI bus to determine if the NAND type memory device has been initialized. The NAND type memory device may have an initial latency (up to 1 millisecond) prior to initialization. Accordingly, any instructions provided to the NAND type memory device prior to the initialization may not be received by the NAND type memory device. While monitoring the second signal, the processing device may determine that the NAND type memory device is initialized. For example, once the NAND type memory device has been initialized, the NAND type memory device may drive the second signal to a high value, indicating that the NAND type memory device is initialized. Alternatively, the second signal having a low value may indicate that the NAND type memory device is not initialized.

Once the second signal has been transmitted by the NAND type memory device to the processing device at the second interconnect terminal, the second interconnect terminal may function as an input/output (IO) terminal for the transmission of data between the processing device and the NAND type memory device. For example, after the NAND type memory device drives the second signal on the second interconnect terminal to a value of 1 to indicate the NAND type memory device is initialized, the second interconnect terminal may be used to transmit a signal including low values (e.g., a value of 0) and high values (e.g., a value of 1) that correspond to the data associated with an operation. After the processing device has determined the NAND type memory device is initialized, the processing device may perform an operation associated with the NAND type memory device at the second interconnect terminal and a third interconnect terminal of the SPI bus.

FIG. 1A illustrates a processing system 100 with a NAND memory controller 115 to control a NAND type memory device 125 over a serial communication interface 112 according an embodiment of the present disclosure. The processing system 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1A, processing system (hereinafter "system") 100 may include various components. In one embodiment, the processing system 100 may include one or more processing core(s) 102, coupled to a processor bus 104 that transmits data signals between processing core 102 and other components in the system 100.

The processing core(s) 102 may execute instructions of the processing system 100. The processing core(s) include, but are not limited to, pre-fetch logic to fetch instructions, decode logic to decode the instructions, execution logic to execute instructions and the like. The processing core 102 may be used with a computing system on a single integrated circuit (IC) chip of a computing system. One embodiment of a computing system on a chip may comprise a processor and a memory. The memory for one such system is a flash memory. The flash memory can be located on the same die as the processor and other system components. Additionally, other logic blocks such as a memory controller or graphics controller can also be located on a system on a chip. The instructions may include, but are not limited to, pre-fetch logic to fetch instructions, decode logic to decode the instructions, execution logic to execute instructions and the like. In one embodiment, a sample computing system may execute a version of an operating system, embedded software, and/or graphical user interfaces. Thus, embodiments of the disclosure are not limited to any specific combination of hardware circuitry and software.

The system 100 also includes a system logic chip 110 coupled to the processor bus 104 and a platform system memory (hereinafter "memory") 120 such as random access memory (SRAM) or dynamic random access memory (DRAM). The system 100 further includes NAND memory 125 for the persistent storage of data. The system logic chip 110 in the illustrated embodiment is a platform controller hub (PCH) 110. The PCH 110 may include a NAND memory controller 115 that includes serial interface logic to manage the sending and receiving of data from NAND memory 125 via a serial communication interface (e.g., SPI bus 112). The PCH 110 may communicate with the NAND memory 125 via an SPI bus 112. Processing core 102 can communicate to the PCH 110 via the processor bus 104. In one embodiment, the processing core 102 may include a clock generation circuit 106 to generate a timing signal to be provided to a memory device (e.g., memory 120) via the PCH 110. In some embodiments, the PCH 110 may be coupled to a NAND type memory device 125 via an SPI bus 112. In other embodiments, the PCH 110 may be coupled to a plurality of memory agents 130a-130n via an inter-processor communication channel such as a peripheral control interconnect (PCI) bus 106. As discussed above, a PCI bus is a parallel synchronized computer bus for attaching physical devices, which may be in the form of an integrated circuit fitted onto the motherboard itself (called a planar device in the PCI specification) or in the form of an expansion card that fits into a slot installed on the motherboard. Examples of PCI cards used in personal computers and servers include: network cards, sound cards, modems, USB ports, TV tuner cards and disk controllers.

Figure 1B:
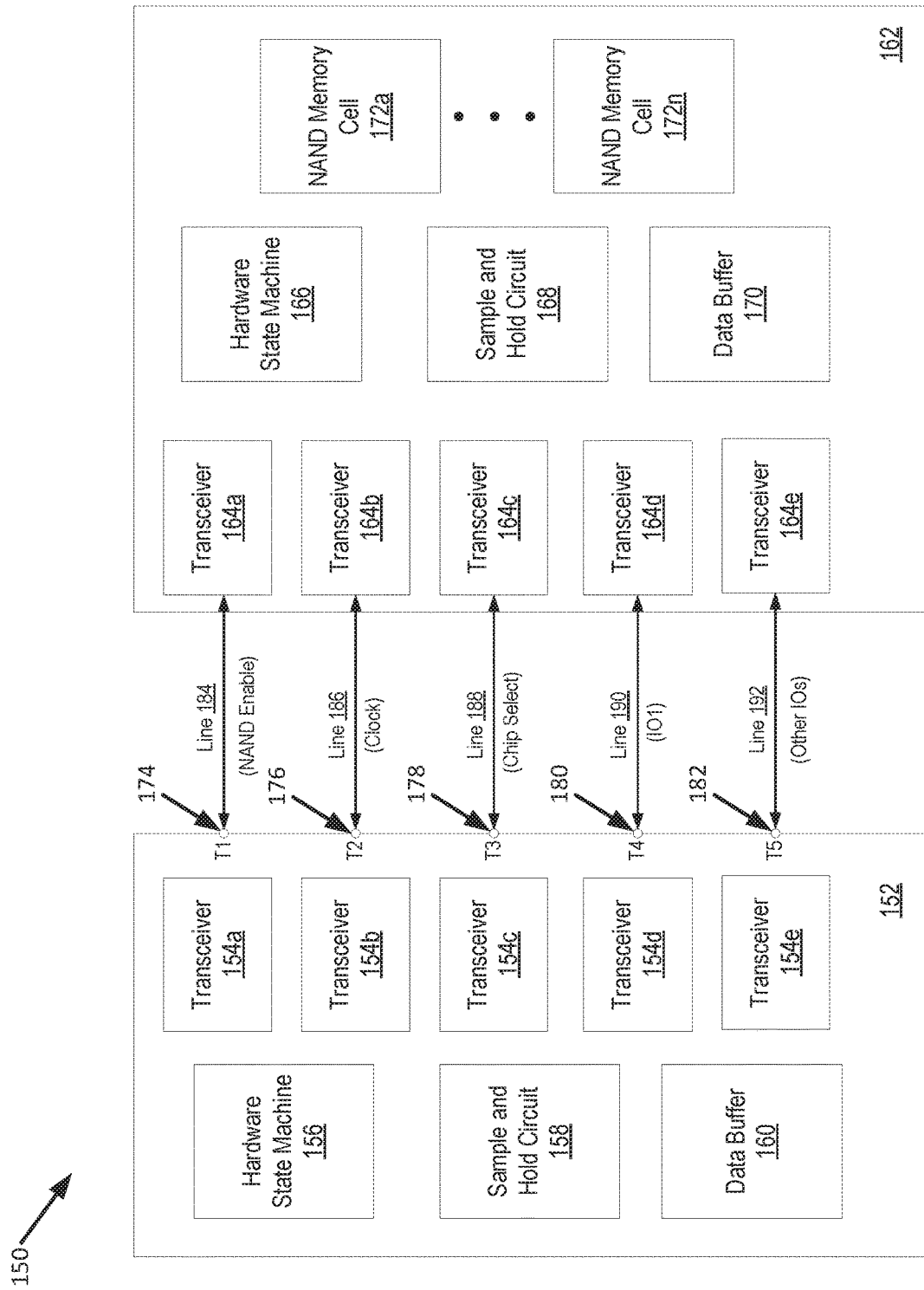
FIG. 1B is a block diagram of a component with a number of transceivers s usable within a serial communication interface to communicate with a NAND memory device, according to an embodiment of the present disclosure.

FIG. 1B is a block diagram of a component 152 with a number of transceiver pairs 150 usable within a serial communication interface to communicate with a NAND memory device 162, according to an embodiment of the present disclosure. The component 152 includes a hardware state machine 156, a number of transceivers 154, sample and hold circuit 158, and data buffer 160.

The transceivers 150 may be coupled to lines 184, 186, 188, 190, and 192 at a number of interconnect terminals 174, 176, 178, 180, and 182, respectively. The NAND memory device 162 includes a number of transceivers 164 that are similarly connected to the lines 184, 186, 188, 190, and 192, respectively. The transceiver 154 and 164 coupled over the transmission lines (184-192) make up the serial interface. In one embodiment, the serial interface may be the SPI bus 112 of FIG. 1A.

The hardware state machine 156 can transition between states based on the signals received over the lines, as described in more detail below. Data transmitted or received at the component 152 can be stored in the data buffer 160. Data received at the component 152 from the NAND memory device 162 can be sampled by the sample and hold circuit 158. The sample and hold circuit 158 and the data buffer 160 can be implemented in various configurations to receive, buffer, convert from serial to parallel format the data received over the serial interface. For example, the data buffer 160 may be shift register that shifts in the individual bits and outputs a digital value when the shift register has shifted a certain number of bits. Similarly, data received or transmitted at the NAND memory device 162 from the component 152 can be sampled by the sample and hold circuit 168. The sample and hold circuit 168 and the data buffer 170 can be implemented in various configurations to receive, buffer, convert from serial to parallel format the data received over the serial interface from the component 152.

The signals that are transmitted and received over lines 184, 186, 188, 190, 192 will be discussed in more detail below. In the embodiment shown, a transceiver at the component 152 and a transceiver at the NAND memory device 162 can be considered a transceiver pair. Each of the transceiver pairs may include a pair of one of the transceivers 154*a-e* and one of the transceivers 164*a-e* for each of lines 184, 186, 188, 190, 192. Accordingly, the component 152 may include transmission logic to transmit data to the NAND memory device 162 and receiving logic to receive data from NAND memory device 162.

In one embodiment, component 152 may correspond to NAND memory controller 115 of FIG. 1A as part of the PCH 110. Alternatively, the component 152 may be a standalone NAND memory controller. In other embodiments, the component 152 may be integrated into other circuits of a processor, a system on chip (SoC), or other integrated circuit.

Referring back to FIG. 1B, NAND memory device 162 may include transmission logic to transmit data to component 152 (e.g., the NAND memory controller) and receiving logic to receive data from component 152. In one embodiment, the NAND memory device 162 may correspond NAND memory device 125 of FIG. 1A. Although the present embodiment illustrates a transceiver pair for each of lines 184-192, in other embodiments, alternative configurations of transceiver pairs may be used. For example, a first transceiver pair may be coupled to lines 184, 186 and second transceiver pair may be coupled to lines 188, 190, 192. It should also be noted that the component 152 may include one or more transmitters and one or more receivers as separate circuits that can be switched or multiplexed to share the lines 184-192.

Component 152 and/or NAND memory device 162 may also include a hardware state machine 156 to monitor the signals on lines 184, 186, 188, 190, 192 and control ownership of SPI bus 112 of FIG. 1B. Component 152 and/or NAND memory device 162 may include sample and hold circuits 158, 168 to measure received signal on lines 184, 186, 188, 190, 192 at a particular point in time. For example, the high and low values of the signal may represent a series of bits. The sample and hold circuits 158, 168 may generate a digital output value based on the series of bits. Component 152 and/or NAND memory device 162 may include data buffers 160, 170 that stores the output of sample and hold circuits 158, 168. Device 162 may further include a number of NAND memory cells 172*a-n* to store data associated with the data signals received over lines 190, 192.

Figure 2:
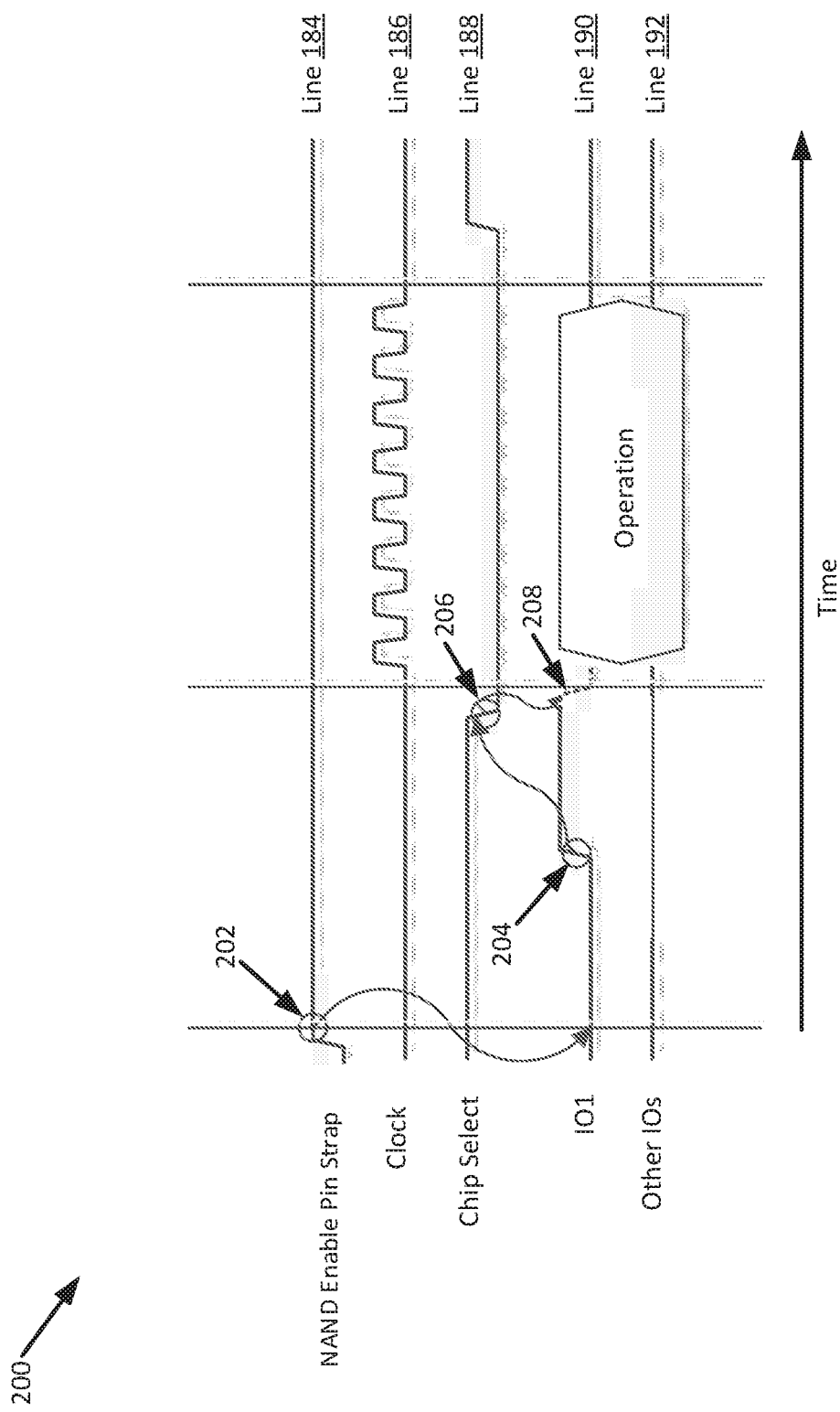
FIG. 2 illustrates an example of initializing a NAND type memory device with a reduced number of interconnect terminals, according to embodiments of the present disclosure.

FIG. 2 illustrates an example of initializing a NAND type memory device 200 with a reduced number of interconnect terminals, according to embodiments of the present disclosure. The illustration includes lines 184, 186, 188, 190, 192 that may correspond to signals transmitted between a processing device and a NAND type memory device at a number of interconnect terminals 174, 176, 178, 180, 182 of FIG. 1B via an SPI bus. In some embodiments, the signals transmitted may be control signals. In other embodiments, the signals may be data signals. Line 184 may correspond to a NAND enable pin strap. The NAND enable pin strap may transmit a signal to the processing device from a memory device indicating that the memory device includes a NAND type memory device. For example, the NAND type memory device may drive the signal on the NAND enable pin strap to a high value (e.g., a value of 1), indicating that the memory device includes a NAND type memory device. The processing device may then receive the signal on the NAND enable pin strap that indicates the memory device includes a NAND type memory device.

Line 186 may correspond to a timing signal generated by the clock generation circuit 106 of FIG. 1A. The clock generation circuit 106 may alternate driving the signal on line 186 between a high value (e.g., a value of 1) and a low value (e.g., a value of 0), which is provided to the NAND type memory device at line 186 via the SPI bus. Line 188 may correspond to a chip select line that functions as a control line to select a chip (e.g., the NAND type memory device) connected to the SPI bus. In one embodiment, the processing device may drive the signal on the chip select line to a high value when the processing device is not performing an operation associated with the NAND type memory device. Alternatively, the processing device may drive the signal on the chip select line to a low value when the processing device is performing an operation associated with the NAND type memory device.

Line 190 may correspond to an input/output line (e.g., IO1). In some embodiments, the NAND type memory device may drive a signal on line 190 to a high value for a period of time once the NAND type memory device is initialized. After the processing device has received the signal indicating the NAND memory is initialized, line 190 may transmit a data signal between the NAND type memory device and the processing device. Line 192 may correspond to other input/output lines (e.g., other IOs). The other IOs may transmit a data signal between the NAND type memory device and the processing device. Although the other IOs are illustrated as a single line (e.g., line 192), in other embodiments the other IOs may include multiple lines. For example, in the current illustration the NAND type memory device may operate in a single IO mode and have 2 IO lines (e.g., lines 190 and 192) to transmit a data signal, resulting in a total of 5 interconnect lines. However, in another embodiment, the NAND type memory device may operate in a quad IO mode and have 4 IO lines to transmit a data signal, resulting in a total of 7 lines coupled to 7 interconnect terminals.

The operation of initializing the NAND type memory device may begin at 202 with the NAND type memory device driving the signal on line 184 (e.g., the NAND enable pin strap) to a high value. The signal on line 184 may indicate to the processing device that the memory device is a NAND type memory device. Upon receiving the signal on line 184 indicating the memory device is a NAND type memory device, the processing device may begin monitoring the signal on line 190 (e.g., IO1) to determine whether or not the NAND type memory device is initialized. After the NAND type memory device has initialized, the NAND type memory device may drive the signal on line 190 to a high value at 204 for a period of time. In some embodiments, after the NAND type memory device has driven the signal to a high value for the period of time, it may drive the signal back to a low value.

After receiving the signal from the NAND type memory device on line 190 indicating the NAND type memory device is initialized, the processing device may drive the signal on line 188 (e.g., chip select) to a low value at 206 to indicate that the processing device is performing an operation associated with the NAND type memory device. Subsequently, the processing device may transmit an instruction at 208 to the NAND type memory device to perform the operation. In one embodiment, the operation may correspond to a read operation and the NAND type memory device may transmit data signals corresponding to data stored on the NAND type memory device to the processing device at lines 190 and 192. In another embodiment, the operation may correspond to a write operation and the processing device may transmit data signals corresponding to data to be stored on the NAND type memory device. Further details regarding the read and write operations will be discussed in more detail below.

Figure 3:
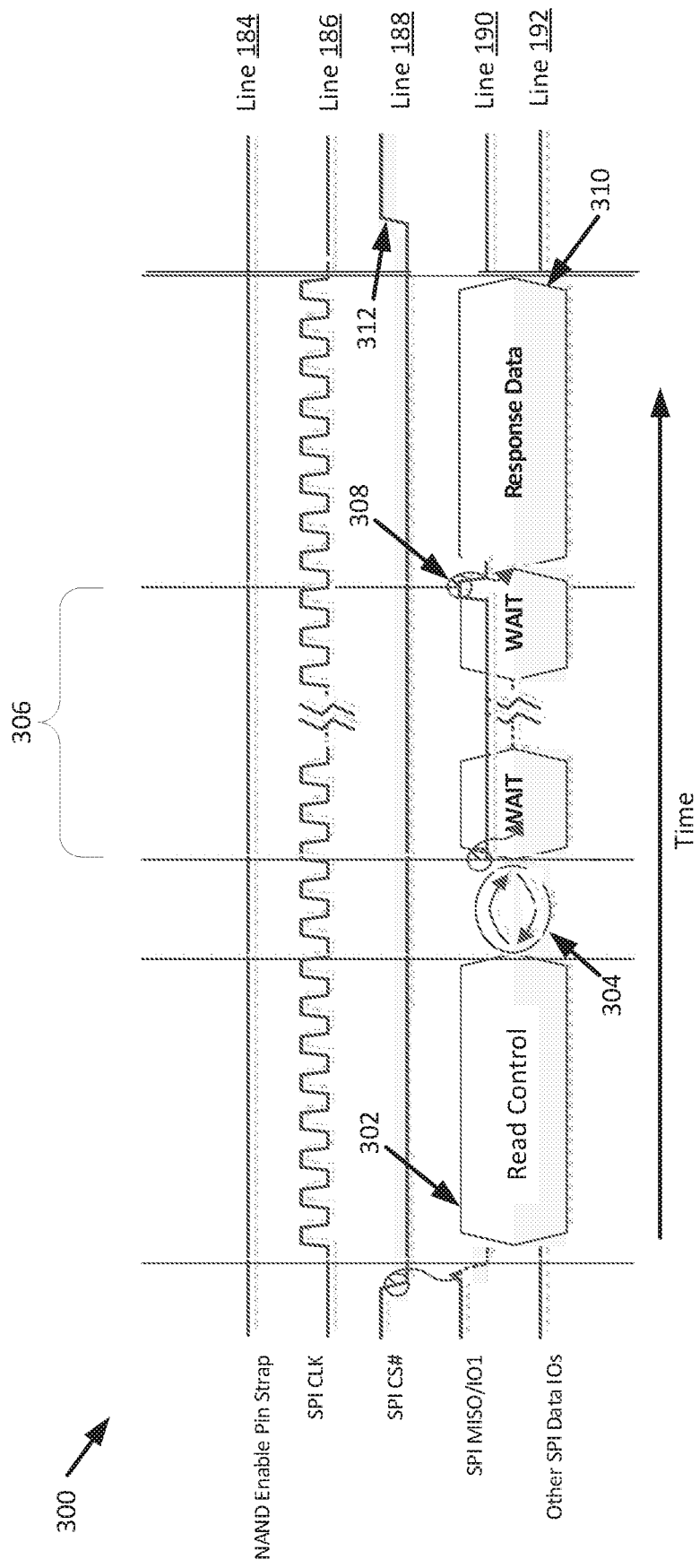
FIG. 3 illustrates an example of performing a read operation on a NAND type memory device having a reduced number of interconnect terminals, according to some embodiments of the present disclosure.

FIG. 3 illustrates an example of performing a read operation 300 on a NAND type memory device with a reduced number of interconnect terminals, according to some embodiments of the present disclosure. Subsequent to the initialization operation discussed in FIG. 2, the processing device may transmit a read control signal 302 to the NAND type memory device at terminals 180 and 182 FIG. 1B via an SPI bus that indicates a read operation is to be performed. The read control signal 302 may also indicate particular data stored on the NAND type memory device that is to be provided by the read operation. In some embodiments, once the read control signal 302 is provided to the NAND type memory device, ownership of the SPI bus may be transferred at 304 from the processing device to the NAND type memory device by the hardware state machine 156 of FIG. 1B (block 2).

After the read control signal 302 has been received by the NAND type memory device, there may be a wait period 306 as the NAND type memory device identifies the data stored on the NAND type memory device that is associated with the read operation and prepares the data for transmission to the processing device. During the wait period 306, the NAND type memory device may drive the signal on line 190 to a low value to indicate the NAND type memory device is not ready to provide the data associated with the read operation to the processing device. Once the NAND type memory device has identified the data associated with the read operation, the NAND type memory device may drive the signal on line 190 to a high value for a period of time at 308 to provide a second read control signal indicating that the NAND type memory device is ready to provide the data to the processing device. After driving the signal on line 190 to a high value, the NAND type memory device may transmit data signals 310 corresponding to the data associated with the read operation to the processing device at terminals 190 and 192. After the data has been provided to the processing device, the NAND type memory device may drive the signal on line 190 to a low value to indicate the NAND type memory device is no longer initialized. The signal on line 188 may then be driven to a high value at 312 by the processing device, indicating that the processing device is not performing an operation associated with the NAND type memory device. Once the NAND type memory device is subsequently initialized and ready to perform a subsequent operation, the NAND type memory device may drive the signal on line 190 to a high value to indicate the NAND type memory device is initialized and the subsequent operation may be performed.

Figure 4:
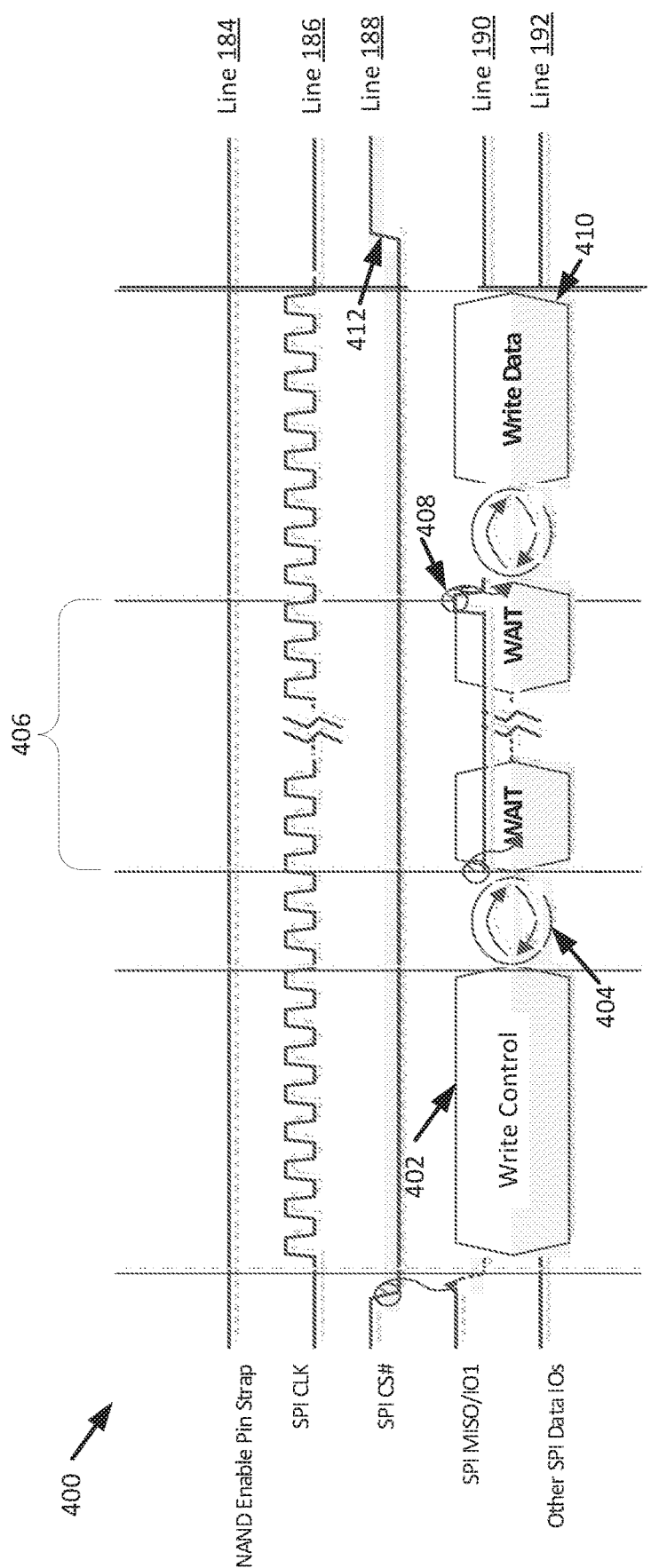
FIG. 4 illustrates an example of performing a write operation on a NAND memory cell of a NAND type memory device with a reduced number of interconnect terminals, according to embodiments of the present disclosure.

FIG. 4 illustrates an example of performing a write operation 400 on a NAND type memory device with a reduced number of interconnect terminals, according to embodiments of the present disclosure. Subsequent to the initialization operation discussed in FIG. 2, the processing device may transmit a write control signal 402 to the NAND type memory device at terminals 180 and 182 of FIG. 1B via an SPI bus indicating that a write operation is to be performed. In some embodiments, once write control signal 402 is provided to the NAND type memory device, ownership of the SPI bus may be transferred at 404 from the processing device to the NAND type memory device by the hardware state machine 156 of FIG. 1B (block 2).

After the write operation command has been received by the NAND type memory device, there may be a wait period 406 until the NAND type memory device is ready to receive data associated with the write operation. During the wait period 406, the NAND type memory device may drive the signal on line 190 to a low value to indicate the NAND type memory device is not ready to receive the data associated with the write operation. Once the NAND type memory device is ready to receive the data associated with the write operation, the NAND type memory device may drive the signal on line 190 to a high value for a period of time at 408 to provide a second write control signal indicating that the NAND type memory device is ready to receive the data from the processing device. After the NAND type memory device drives the signal on line 190 to a high value, the processing device may transmit data signals 410 corresponding to the data associated with the write operation to the NAND type memory device at terminals 180 and 182 of FIG. 1B. After the data has been stored on the NAND type memory device, the NAND type memory device may drive the signal on line 190 to a low value to indicate the NAND type memory device is no longer initialized. The signal on line 188 may then be driven to a high value at 412 by the processing device to indicate that processing device is no longer performing an operations associated with the NAND type memory device. Once the NAND type memory device is subsequently initialized and ready to perform a subsequent operation, the NAND type memory device may drive the signal on line 190 to a high value to indicate the NAND type memory device is initialized and the subsequent operation may be performed.

Figure 5:
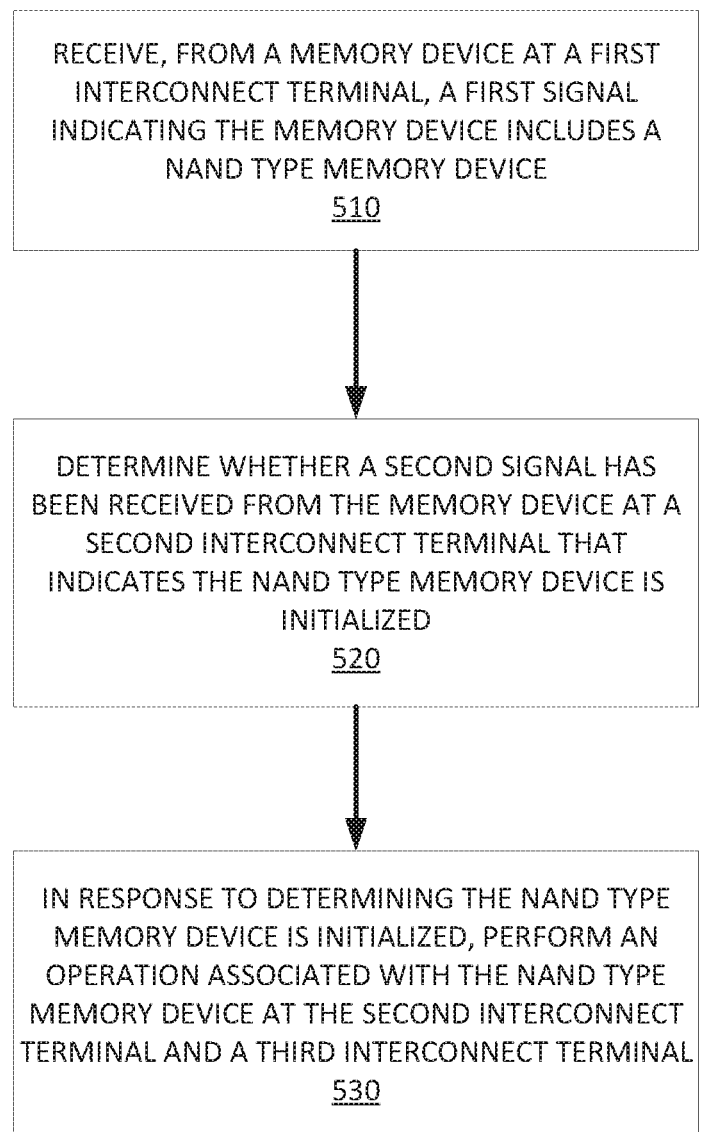
FIG. 5 is a flow diagram of an example method to perform an operation on a NAND type memory device having a reduced number of interconnect terminals, according to one embodiment of the present disclosure.

FIG. 5 is a flow diagram of an example method 500 to perform an operation on a NAND type memory device with a reduced number of interconnect terminals. The method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the NAND memory controller 115 of the PCH 110 of FIG. 1A.

Method 500 may begin by a processing device receiving, from a memory device at a first interconnect terminal of a number of interconnect terminals via a serial communication interface, a first signal indicating the memory device includes a NAND type memory device (block 510). For example, the signal on line 1 of FIG. 2 may be driven to a high value to indicate the memory device includes a NAND type memory device and received by the processing device at terminal 174 via an SPI bus. After receiving the signal indicating the memory device includes a NAND type memory device, the processing device may determine whether a second signal that indicates the NAND type memory device is initialized has been received from the memory device at a second interconnect terminal (block 520). For example, the memory device may drive the signal on line 190 of FIG. 2 to a high value for a period of time to indicate that the NAND type memory device is initialized. The signal on line 190 may then be received by the processing device at 180. Once the processing device determines the second signal has been received from the memory device that indicates the NAND type memory device is initialized, the processing device may perform an operation associated with the NAND type memory device at the second interconnect terminal and a third interconnect terminal (block 530). For example, the processing device may perform an operation associated with the NAND type memory device at terminals 180 and 182.

In one embodiment, the operation may be a read operation as discussed in FIG. 3. In another embodiment, the operation may be a write operation as discussed in FIG. 4. In some embodiments, multiple operations may be queued by the processing device to be performed sequentially once the NAND type memory device is initialized. For example, 2 read operations and 1 write operation may be queued prior to the initialization of the NAND type memory device. Accordingly, the 2 read operations and 1 write operation may be performed in sequence after the NAND type memory device is initialized. In other embodiments, the processing device may receive a signal at the second interconnect terminal that indicates the operation associated with the NAND type memory device has been performed. For example, after the NAND type memory device has completed a write operation, the NAND type memory device may transmit a signal to the processing device on line 4 indicating that the write operation has been completed.

Figure 6:
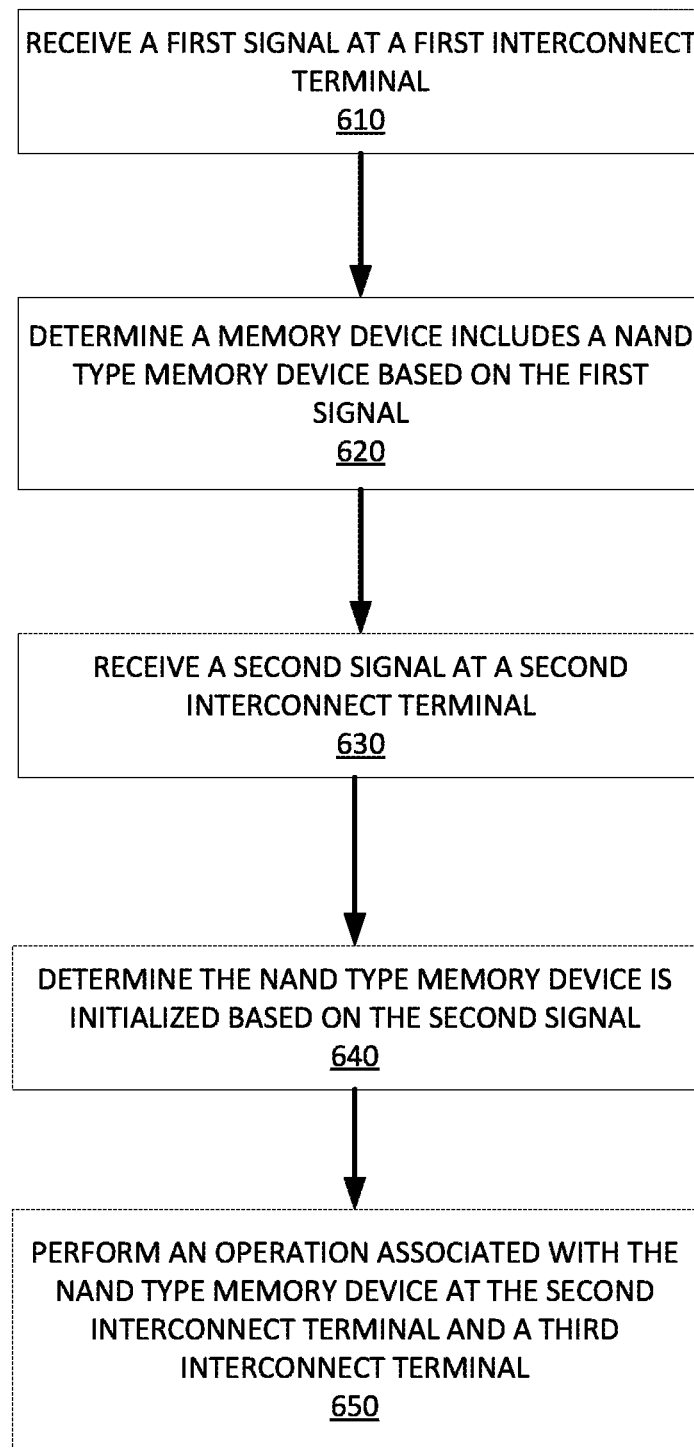
FIG. 6 is a flow diagram of an example method to perform an operation on a determined NAND device based on received signals, according to another embodiment of the present disclosure.

FIG. 6 is a flow diagram of an example method 600 to perform an operation on a determined NAND device based on received signals. The method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 may be performed by the NAND memory controller 115 of the PCH 110 of FIG. 1A.

Method 600 may begin by a processing device receiving a first signal at a first interconnect terminal (block 610). For example, the processing device may receive a signal on line 184 at terminal 174 of FIG. 1B. The processing device may determine that the memory device includes a NAND type memory device based on the first signal (block 620). For example, if the signal received on line 184 has a high value, the processing device may determine that the memory device includes a NAND type memory device. The processing device may receive a second signal at a second interconnect terminal (block 630). For example, the processing device may receive a signal on line 190 at terminal 180 of FIG. 1B. Upon receiving the second signal, the processing device may determine the NAND type memory device is initialized based on the second signal (block 640). For example, the memory device may drive the signal on line 190 of FIG. 2 to a high value for a period of time to indicate that the NAND type memory device is initialized. Once the processing device determines that the NAND type memory device is initialized, the processing device may perform an operation associated with the NAND type memory device at the second interconnect terminal and a third interconnect terminal (block 650). For example, the processing device may perform an operation associated with the NAND type memory device at terminals 180 and 182 of FIG. 1B. In one embodiment, the operation may be a read operation as discussed in FIG. 3. In another embodiment, the operation may be a write operation as discussed in FIG. 4.

Figure 7:
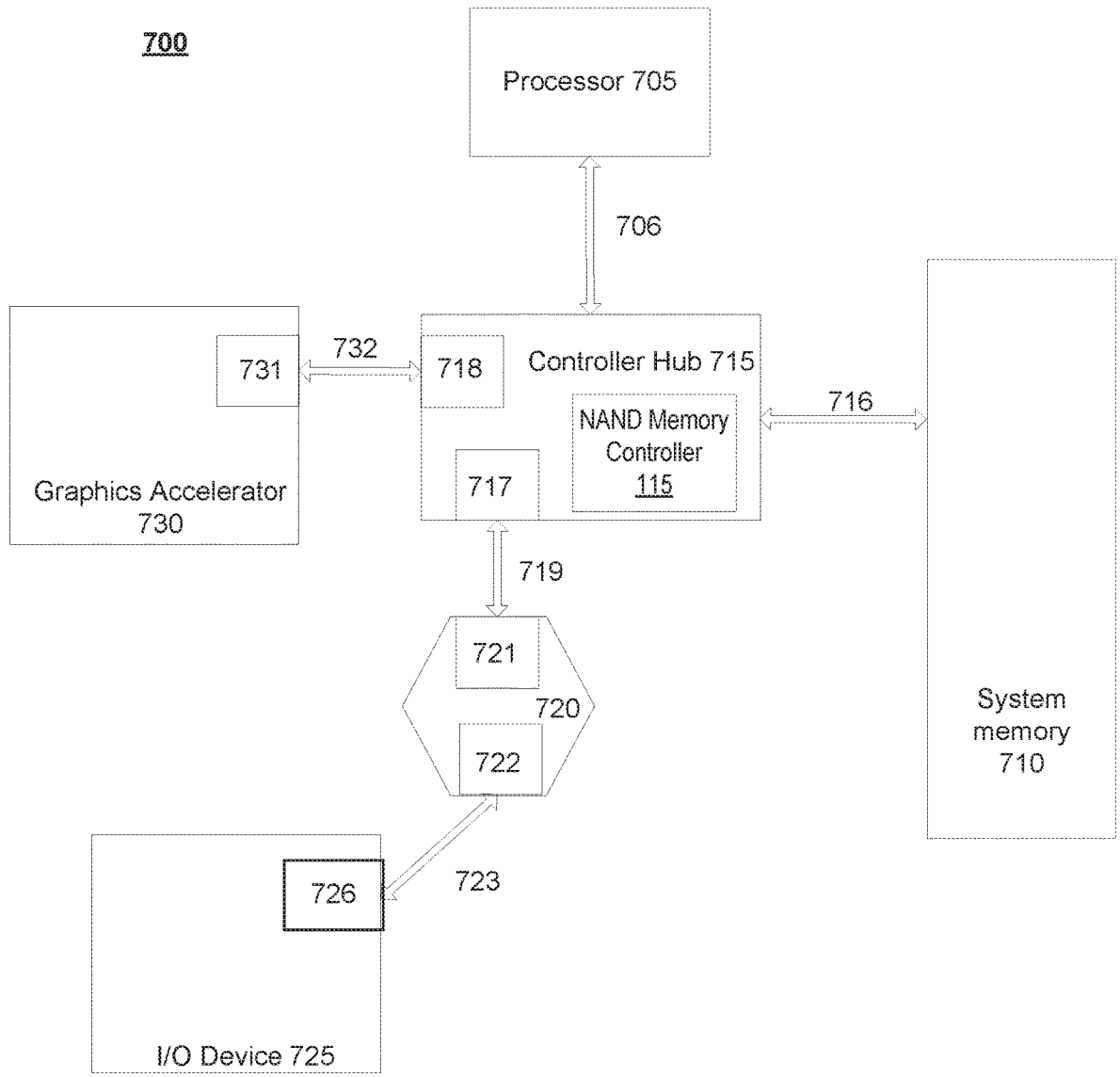
FIG. 7 illustrates a system on a chip (SOC) design with a NAND memory controller with serial interface logic, according to one embodiment.

FIG. 7 illustrates a computer system 700 with multiple interconnects, according to one embodiment. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, FSB 706 (e.g., link) includes a serial, differential interconnect architecture that is compliant with different interconnect standards. In one embodiment, the controller hub 715 may include the NAND memory controller 115 of FIG. 1A.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller. Examples of controller hub 715 include a chipset, a memory controller hub (MCH), a north bridge, an interconnect controller hub (ICH) a south bridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex (e.g., controller 715).

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root controller, from processor 705 or system memory 710 to device 725. Switch 720, in one embodiment, is referred to as a logical assembly of multiple virtual PCI-to-PCI bridge devices (bridge devices that communicate according to a PCI protocol). Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Fire wire device, a Universal Serial Bus (USB) device, a scanner, and other input/output devices. Often in the PCIe® vernacular, such as device, is referred to as an endpoint. Although not specifically shown, device 725 may include a PCIe® to PCI/PCI-X bridge to support devices that communicate according to the legacy protocol, PCI protocol, etc. Endpoint devices that communicate according to PCIe® standard are often classified as legacy, PCIe®, or root complex integrated endpoints (RCiEP).

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

I/O device 725 includes an interface 726 and switch/bridge 720 includes an interface 722. Interface 726 is coupled to interface 722 via serial link 723.

In one embodiment, short range wireless engines including a WLAN unit and a Bluetooth® unit may couple to processor 705 via an interconnect according to a PCIe® protocol, e.g., in accordance with the PCI Express® Specification Base Specification version 4.0 (Base Specification Revision 4.0 Version 0.3 published Feb. 19, 2014, etc.), or another such protocol such as a serial data input/output (SDIO) standard. Of course, the actual physical connection between these peripheral devices, which may be configured on one or more add-in cards, can be by way of the NGFF connectors adapted to a motherboard. Using WLAN unit, Wi-Fi® communications in accordance with a given Institute of Electrical and Electronics Engineers (IEEE) 802.11 standard can be realized, while via a unit using the Bluetooth® technology, short range communications via a Bluetooth® protocol can occur. In another embodiment, these units may communicate with processor 705 via, e.g., a USB link or a universal asynchronous receiver transmitter (UART) link.

Figure 8:
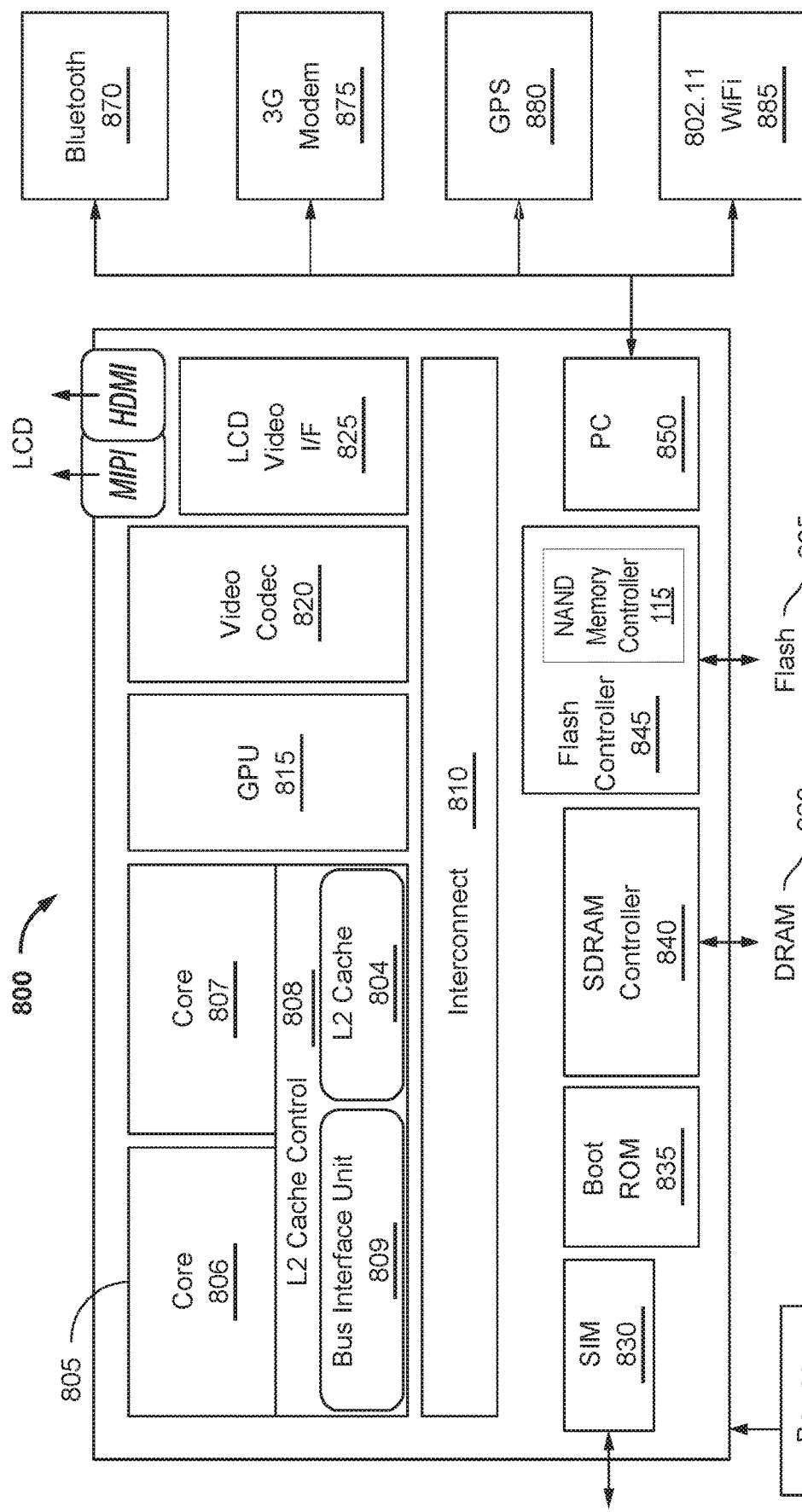
FIG. 8 illustrates a block diagram for a computing system with a NAND memory controller with serial interface logic, according to certain embodiments.

Turning next to FIG. 8, an embodiment of a system on-chip (SOC) design in accordance with the disclosures is depicted. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Similar to the discussion above, cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 804 to communicate with other parts of system 800. Interconnect 810 includes an on-chip interconnect, such as an IOSF, AMBA, or other interconnect discussed above, which potentially implements one or more aspects of the described disclosure.

Interface 810 provides communication channels to the other components, such as a Subscriber Identity Module (SIM) 830 to interface with a SIM card, a boot rom 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. In one embodiment, the flash controller 845 may include the NAND memory controller 115 of FIG. 1A. Any of these interfaces may incorporate aspects of the disclosure described herein.

In addition, the system illustrates peripherals for communication, such as a Bluetooth® module 870, 3G modem 875, GPS 885, and Wi-Fi® 885. Note as stated above, a UE includes a radio for communication. As a result, these peripheral communication modules are not all required. However, in a UE some form a radio for external communication is to be included.

The following examples pertain to further embodiments.

Example 1 is processing device comprising: a hardware logic circuits to implement a hardware state machine; and a plurality of interconnect terminals coupled to the hardware logic circuits, the hardware logic circuits to: receive, from a memory device via a first interconnect terminal of the plurality of interconnect terminals, a first signal indicating the memory device comprises a negative-and (NAND) memory cell; determine whether a second signal has been received from the memory device via a second interconnect terminal of the plurality of interconnect terminals, the second signal indicating the NAND memory cell is initialized; and in response to determining the second signal has been received from the memory device indicating the NAND memory cell is initialized, perform an operation associated with the NAND memory cell via the second interconnect terminal and a third interconnect terminal of the plurality of interconnect terminals.

In Example 2, the subject matter of Example 1, further comprising: a clock generation circuit coupled to a fourth interconnect terminal of the plurality of interconnect terminals, the clock generation circuit to generate a timing signal to be provided to the memory device via a fourth interconnect terminal of the plurality of interconnect terminals.

In Example 3, the subject matter of any one of Examples 1-2, wherein to perform the operation associated with the NAND memory cell, the hardware logic circuits to: transmit an instruction corresponding to a read operation to the NAND memory cell via the second interconnect terminal and the third interconnect terminal; receive a third signal from the NAND memory cell via the second interconnect terminal that indicates the NAND memory cell is ready to provide data associated with the read operation; and receive the data associated with the read operation from the NAND memory cell via the second interconnect terminal and the third interconnect terminal.

In Example 4, the subject matter of any one of Examples 1-3, wherein to perform the operation associated with the NAND memory cell, the hardware logic circuits to: transmit an instruction corresponding to a write operation to the NAND memory cell via the second interconnect terminal and the third interconnect terminal; receive a third signal from the NAND memory cell via the second interconnect terminal that indicates the NAND memory cell is ready to receive data associated with the write operation; and provide the data associated with the write operation to the NAND memory cell via the second interconnect terminal and the third interconnect terminal.

In Example 5, the subject matter of any one of Examples 1-4, further comprising: a data buffer operatively coupled to the plurality of interconnect terminals to store a sequence of bits associated with the operation.

In Example 6, the subject matter of any one of Examples 1-5, wherein the hardware logic circuits are further to: receive, from the memory device via the second interconnect terminal of the plurality of interconnect terminals, a third signal indicating the NAND memory cell is not initialized.

In Example 7, the subject matter of any one of Examples 1-6, wherein the plurality of interconnect terminals is less than 7 interconnect terminals.

Example 8 is a system comprising: a processing device comprising a plurality of interconnect terminals; and a memory device comprising a negative-and (NAND) memory cell operatively coupled to the processing device via the plurality of interconnect terminals, wherein the NAND memory cell is to transmit signals to the processing device via the plurality of interconnect terminals, the processing device to: receive a first signal via a first interconnect terminal of the plurality of interconnect terminals; determine that the memory device comprises the NAND memory cell based on the first signal; receive a second signal via a second interconnect terminal of the plurality of interconnect terminals; determine the NAND memory cell is initialized based on the second signal; and perform an operation associated with the NAND memory cell via the second interconnect terminal and a third interconnect terminal of the plurality of interconnect terminals.

In Example 9, the subject matter of Example 8, wherein the second interconnect terminal of the plurality of interconnect terminals comprises a dual-purpose input output terminal.

In Example 10, the subject matter of any one of Examples 8-9, wherein the third interconnect terminal of the plurality of interconnect terminals comprises an input output terminal to provide or receive a signal from the memory device.

In Example 11, the subject matter of any one of Examples 8-10, further comprising: a hardware state machine to monitor signals transmitted via the plurality of interconnect terminals from the memory device.

In Example 12, the subject matter of any one of Examples 8-11, wherein to perform the operation associated with the NAND memory cell, the processing device to: transmit an instruction corresponding to a read operation to the NAND memory cell via the second interconnect terminal and the third interconnect terminal; receive a third signal from the NAND memory cell via the second interconnect terminal that indicates the NAND memory cell is ready to provide data associated with the read operation; and receive the data associated with the read operation from the NAND memory cell via the second interconnect terminal and the third interconnect terminal.

In Example 13, the subject matter of any one of Examples 8-12, wherein to perform the operation associated with the NAND memory cell, the processing device to: transmit an instruction corresponding to a write operation to the NAND memory cell via the second interconnect terminal and the third interconnect terminal; receive a third signal from the NAND memory cell via the second interconnect terminal that indicates the NAND memory cell is ready to receive data associated with the write operation; and provide the data associated with the write operation to the NAND memory cell via the second interconnect terminal and the third interconnect terminal.

In Example 14, the subject matter of any one of Examples 8-13, further comprising: a clock generation circuit coupled to a fourth interconnect terminal of the plurality of interconnect terminals, the clock generation circuit to generate a timing signal to be provided to the memory device via a fourth interconnect terminal of the plurality of interconnect terminals.

Example 15 is a method comprising: receiving, from a memory device via a first interconnect terminal of a plurality of interconnect terminals, a first signal indicating the memory device comprises a negative-and (NAND) memory cell; determining, by a processing device, whether a second signal has been received from the memory device via a second interconnect terminal of the plurality of interconnect terminals, the second signal indicating the NAND memory cell is initialized; and in response to determining the second signal has been received from the memory device indicating the NAND memory cell is initialized, performing an operation associated with the NAND memory cell via the second interconnect terminal and a third interconnect terminal of the plurality of interconnect terminals.

In Example 16, the subject matter of Example 15, wherein performing the operation associated with the NAND memory cell comprises: transmitting an instruction corresponding to a read operation to the NAND memory cell via the second interconnect terminal and the third interconnect terminal; receiving a third signal from the NAND memory cell via the second interconnect terminal that indicates the NAND memory cell is ready to provide data associated with the read operation; and receiving the data associated with the read operation from the NAND memory cell via the second interconnect terminal and the third interconnect terminal.

In Example 17, the subject matter of any one of Examples 15-16, wherein performing the operation associated with the NAND memory cell comprises: transmitting an instruction corresponding to a write operation to the NAND memory cell via the second interconnect terminal and the third interconnect terminal; receiving a third signal from the NAND memory cell via the second interconnect terminal that indicates the NAND memory cell is ready to receive data associated with the write operation; and providing the data associated with the write operation to the NAND memory cell via the second interconnect terminal and the third interconnect terminal.

In Example 18, the subject matter of any one of Examples 15-17, further comprising: receiving a third signal from the memory device via the second interconnect terminal indicating the operation associated with the NAND memory cell has been performed.

In Example 19, the subject matter of any one of Examples 15-18, further comprising: receiving, from the memory device via the second interconnect terminal of the plurality of interconnect terminals, a third signal indicating the NAND memory cell is not initialized.

In Example 20, the subject matter of any one of Examples 15-19, wherein the plurality of interconnect terminals is less than 7 interconnect terminals.

Example 21 is an apparatus comprising means to perform a method of any one of Examples 15-20.

Example 22 is at least one machine readable medium comprising a plurality of instructions, wherein executed, to implement a method or realize an apparatus of any of Examples 15-20.

Example 23 is an apparatus comprising means for performing the method of any one of Examples 15-20.

Example 24 is an apparatus comprising a processor configured to perform the method of any one of Examples 15-20.

Various embodiments can have different combinations of the structural features described above. For instance, all optional features of the computing system described above can also be implemented with respect to the method or process described herein and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments may be described with reference to timestamp validation of components in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing," "receiving," "determining," "outputting," "inverting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A processing device comprising:
   a hardware logic circuit to implement a hardware state machine; and
   a plurality of interconnect terminals coupled to the hardware logic circuit, the hardware logic circuit to:
      receive, from a memory device at a first interconnect terminal of the plurality of interconnect terminals via a serial communication interface, a first signal indicating the memory device is a NAND type memory device;
      determine whether a second signal has been received from the memory device at a second interconnect terminal of the plurality of interconnect terminals, the second signal indicating the NAND type memory device is initialized; and
      in response to determining the second signal has been received from the memory device indicating the NAND type memory device is initialized, perform an operation associated with the NAND type memory device at the second interconnect terminal and a third interconnect terminal of the plurality of interconnect terminals.

2. The processing device of claim 1, further comprising a clock generation circuit coupled to a fourth interconnect terminal of the plurality of interconnect terminals, the clock generation circuit to generate a timing signal to be provided to the memory device at the fourth interconnect terminal of the plurality of interconnect terminals.

3. The processing device of claim 1, wherein the operation is a read operation, wherein the hardware logic circuit for the read operation is to:

transmit a first read control signal to the NAND type memory device at the second interconnect terminal and the third interconnect terminal;
receive a second read control signal from the NAND type memory device at the second interconnect terminal that indicates the NAND type memory device is ready to provide data associated with the read operation; and
receive the data associated with the read operation from the NAND type memory device at the second interconnect terminal and the third interconnect terminal.

4. The processing device of claim 1, wherein the operation is a write operation, wherein the hardware logic circuit for the write operation is to:
transmit a first write control signal to the NAND type memory device at the second interconnect terminal and the third interconnect terminal;
receive a second write control signal from the NAND type memory device at the second interconnect terminal that indicates the NAND type memory device is ready to receive data associated with the write operation; and
provide the data associated with the write operation to the NAND type memory device at the second interconnect terminal and the third interconnect terminal.

5. The processing device of claim 1, further comprising:
a sample and hold circuit to measure values associated with signals received at the plurality of interconnect terminals, hold the values associated with the signals and produce an output corresponding to the values; and
a data buffer operatively coupled to the sample and hold circuit, the data buffer to store the output corresponding to the values.

6. The processing device of claim 1, wherein the hardware logic circuit is further to:
receive, from the memory device at the second interconnect terminal of the plurality of interconnect terminals, a third signal indicating the NAND type memory device is not initialized.

7. The processing device of claim 1, wherein the plurality of interconnect terminals is less than seven interconnect terminals.

8. A system comprising:
a processing device comprising a plurality of interconnect terminals; and
a memory device comprising a NAND type memory device operatively coupled to the processing device at the plurality of interconnect terminals via a serial communication interface, wherein the NAND type memory device is to transmit signals to the processing device via the plurality of interconnect terminals, the processing device to:
receive a first signal at a first interconnect terminal of the plurality of interconnect terminals;
determine that the memory device comprises the NAND type memory device based on the first signal;
receive a second signal at a second interconnect terminal of the plurality of interconnect terminals;
determine the NAND type memory device is initialized based on the second signal; and
perform an operation associated with the NAND type memory device at the second interconnect terminal and a third interconnect terminal of the plurality of interconnect terminals.

9. The system of claim 8, wherein the second interconnect terminal of the plurality of interconnect terminals comprises a dual-purpose input output terminal.

10. The system of claim 8, wherein the third interconnect terminal of the plurality of interconnect terminals comprises an input output terminal to provide or receive a signal from the memory device.

11. The system of claim 8, further comprising:
a hardware state machine to monitor signals transmitted at the plurality of interconnect terminals from the memory device.

12. The system of claim 8, wherein the operation is a read operation, wherein the processing device is to:
transmit a first read control signal to the NAND type memory device at the second interconnect terminal and the third interconnect terminal;
receive a second read control signal from the NAND type memory device at the second interconnect terminal that indicates the NAND type memory device is ready to provide data associated with the read operation; and
receive the data associated with the read operation from the NAND type memory device at the second interconnect terminal and the third interconnect terminal.

13. The system of claim 8, wherein the operation is a write operation, wherein the processing device is to:
transmit a first write control signal to the NAND type memory device at the second interconnect terminal and the third interconnect terminal;
receive a second write control signal from the NAND type memory device at the second interconnect terminal that indicates the NAND type memory device is ready to receive data associated with the write operation; and
provide the data associated with the write operation to the NAND type memory device at the second interconnect terminal and the third interconnect terminal.

14. The system of claim 8, further comprising:
a clock generation circuit coupled to a fourth interconnect terminal of the plurality of interconnect terminals, the clock generation circuit to generate a timing signal to be provided to the memory device at a fourth interconnect terminal of the plurality of interconnect terminals.

15. A method comprising:
receiving, from a memory device at a first interconnect terminal of a plurality of interconnect terminals via a serial communication interface, a first signal indicating the memory device comprises a NAND type memory device;
determining, by a processing device, whether a second signal has been received from the memory device at a second interconnect terminal of the plurality of interconnect terminals, the second signal indicating the NAND type memory device is initialized; and
in response to determining the second signal has been received from the memory device indicating the NAND type memory device is initialized, performing an operation associated with the NAND type memory device at the second interconnect terminal and a third interconnect terminal of the plurality of interconnect terminals.

16. The method of claim 15, wherein the operation is a read operation comprising:
transmitting a first read control signal to the NAND type memory device at the second interconnect terminal and the third interconnect terminal;
receiving a second read control signal from the NAND type memory device at the second interconnect terminal that indicates the NAND type memory device is ready to provide data associated with the read operation; and receiving the data associated with the read operation from the NAND type memory device at the second interconnect terminal and the third interconnect terminal.

17. The method of claim 15, wherein the operation is a write operation comprising:
transmitting a first write control signal to the NAND type memory device at the second interconnect terminal and the third interconnect terminal;
receiving a second write control signal from the NAND type memory device at the second interconnect terminal that indicates the NAND type memory device is ready to receive data associated with the write operation; and
providing the data associated with the write operation to the NAND type memory device at the second interconnect terminal and the third interconnect terminal.

18. The method of claim 15, further comprising:
receiving a third signal from the memory device at the second interconnect terminal indicating the operation associated with the NAND type memory device has been performed.

19. The method of claim 15, further comprising:
receiving, from the memory device at the second interconnect terminal of the plurality of interconnect terminals, a third signal indicating the NAND type memory device is not initialized.

20. The method of claim 15, wherein the plurality of interconnect terminals is less than seven interconnect terminals.

* * * * *